United States Patent
Springfield et al.

(10) Patent No.: US 9,146,601 B2
(45) Date of Patent: Sep. 29, 2015

(54) SYSTEMS AND METHODS FOR ELECTRONIC DEVICE POWER MANAGEMENT

(75) Inventors: Randall S. Springfield, Chapel Hill, NC (US); Kenneth S. Seethaler, Wake Forest, NC (US); Howard Locker, Cary, NC (US); Richard W. Cheston, Morrisville, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1013 days.

(21) Appl. No.: 12/623,020

(22) Filed: Nov. 20, 2009

(65) Prior Publication Data

US 2011/0126033 A1    May 26, 2011

(51) Int. Cl.
G06F 1/00  (2006.01)
G06F 1/32  (2006.01)

(52) U.S. Cl.
CPC .............. *G06F 1/3203* (2013.01); *G06F 1/325* (2013.01)

(58) Field of Classification Search
CPC ...... G06F 1/3203; G06F 1/325; G06F 1/3234
USPC ........... 713/300, 310, 323, 324; 370/311, 346
See application file for complete search history.

(56) References Cited

U.S. PATENT DOCUMENTS

| | | | |
|---|---|---|---|
| 5,974,327 A * | 10/1999 | Agrawal et al. ............ 455/452.2 |
| 6,973,335 B2 * | 12/2005 | Ganton .......................... 455/573 |
| 7,093,141 B2 * | 8/2006 | Elnozahy et al. ............. 713/300 |
| 7,561,901 B2 * | 7/2009 | Jansson et al. ................ 455/574 |
| 7,941,180 B2 * | 5/2011 | Karaoguz et al. .......... 455/556.1 |
| 7,969,928 B2 * | 6/2011 | Chiricescu et al. ........... 370/318 |
| 7,987,378 B2 * | 7/2011 | Lee et al. ...................... 713/320 |
| 8,001,400 B2 * | 8/2011 | Fadell ............................ 713/320 |
| 8,150,475 B2 * | 4/2012 | Gilmore et al. ............... 455/572 |
| 2006/0069769 A1 * | 3/2006 | Dacosta ........................ 709/224 |
| 2006/0135218 A1 * | 6/2006 | Son et al. ...................... 455/573 |
| 2006/0277277 A1 * | 12/2006 | Landschaft et al. .......... 709/220 |
| 2006/0290326 A1 * | 12/2006 | Bhesania et al. ............. 323/210 |
| 2007/0177567 A1 * | 8/2007 | Parys ............................ 370/346 |
| 2008/0049653 A1 * | 2/2008 | Demirhan et al. ............ 370/311 |
| 2008/0165829 A1 * | 7/2008 | Lee et al. ...................... 375/130 |
| 2008/0294731 A1 * | 11/2008 | Roy .............................. 709/206 |
| 2009/0077277 A1 * | 3/2009 | Vidal et al. ...................... 710/46 |
| 2009/0164810 A1 * | 6/2009 | Kyro et al. .................... 713/310 |
| 2009/0210621 A1 * | 8/2009 | Honda et al. .................. 711/115 |
| 2010/0132032 A1 | 5/2010 | Vanover |
| 2010/0174796 A1 * | 7/2010 | Fleck et al. ................... 709/206 |

(Continued)

FOREIGN PATENT DOCUMENTS

GB    2386794 A   *   9/2003

OTHER PUBLICATIONS

Burch Seymour, Bluetooth Master/Slave Communications and Sniff/Sniff Sub-Rating Modes White Paper, Aug. 14, 2008, Bluetooth special interest group, V10r00, section 2.4 2nd paragraph.*

*Primary Examiner* — Jaweed A Abbaszadeh
*Assistant Examiner* — Austin Hicks
(74) *Attorney, Agent, or Firm* — Ference & Associates LLC

(57) ABSTRACT

Embodiments of the invention implement one or more power management policies on one or more devices in order intelligently to manage the finite amount of battery power available while maximizing synchronization between connected devices.

15 Claims, 3 Drawing Sheets

(56) References Cited

U.S. PATENT DOCUMENTS

| | | | |
|---|---|---|---|
| 2011/0047287 A1* | 2/2011 | Harrang et al. | 709/235 |
| 2011/0060927 A1* | 3/2011 | Fillingim et al. | 713/320 |
| 2011/0084807 A1* | 4/2011 | Logan et al. | 340/10.1 |
| 2011/0116429 A1* | 5/2011 | Jeon et al. | 370/311 |
| 2011/0153728 A1* | 6/2011 | Einarsson et al. | 709/203 |
| 2012/0246493 A1* | 9/2012 | Bhesania et al. | 713/300 |

* cited by examiner

SYSTEMS AND METHODS FOR ELECTRONIC DEVICE POWER MANAGEMENT

BACKGROUND

Subject matter presented herein generally relates to power management of electronic devices. As applications for laptop PCs and other mobile computing devices (such as mobile/smart phones, personal digital assistants and the like) increase in number, the demand for power also increases. Because mobile devices are currently limited to a fixed amount of battery life, conserving this power source is highly desirable. Intelligently managing the power in mobile computing devices is therefore of increasing importance.

BRIEF SUMMARY

Embodiments of the invention provide systems, methods, apparatuses and program storage devices configured to intelligently manage power usage in one or more electronic devices. Various embodiments of the invention are particularly well suited for optimizing the power usage of two or more devices used in connection with one another.

In summary, one aspect of the invention provides an apparatus comprising: one or more processors; and a program storage device tangibly embodying a program of instructions executable by the one or more processors, the program of instructions comprising: computer readable program code configured to implement one or more communication protocols that implement one or more power management policies configured to reduce power consumption of one or more other electronic devices in communication with the apparatus.

Another aspect of the invention provides a method comprising: utilizing one or more processors to execute a program of instructions tangibly embodied on one or more program storage devices, the program of instructions comprising: computer readable program code configured to implement on a first electronic device one or more communication protocols that implement one or more power management policies configured to reduce power consumption of one or more other electronic devices in communication with the first electronic device.

A further aspect of the invention provides a computer program product comprising: a computer readable storage medium having computer readable program code embodied therewith, the computer readable program code comprising: computer readable program code configured to implement on a first electronic device one or more communication protocols that implement one or more power management policies configured to reduce power consumption of one or more other electronic devices in communication with the first electronic device.

For a better understanding of the embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
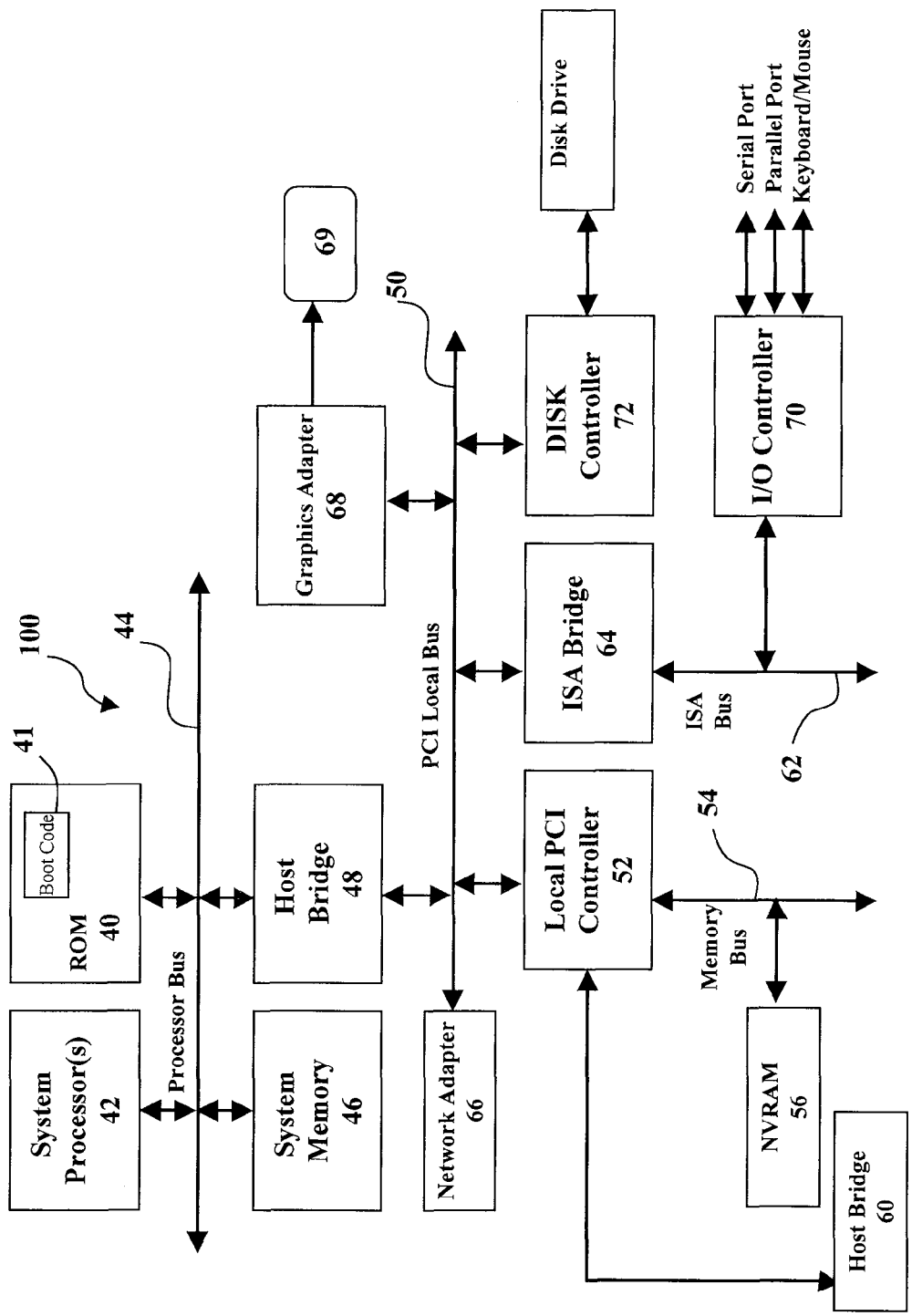
FIG. 1 illustrates a computer system according to an exemplary embodiment of the invention.

It will be readily understood that the components of the embodiments of the invention, as generally described and illustrated in the Figures herein, may be arranged and designed in a wide variety of different configurations in addition to the described exemplary embodiments. Thus, the following more detailed description of the embodiments of the present invention, as represented in the Figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that aspects of the invention can be practiced without one or more of the specific details, or with other methods, components, materials, etc. In other instances, well-known structures, materials, or operations are not shown or described in detail to avoid obscuring aspects of the invention. For example, herein exemplary use cases involving a laptop PC and a mobile phone are presented. However, these devices are simply utilized to highlight certain aspects of the invention. It should also be noted that although the description uses Bluetooth® wireless communication/interface as an example throughout, the embodiments of the invention are not limited to this physical interface. The interface could also include for example WLAN and WWAN. The Bluetooth® word mark, figure mark, and combination mark are all trademarks that are owned by the Bluetooth® SIG in the United States and other countries.

Various embodiments of the invention work in a "constant connect" or "always on" environment. Such a system is described in co-pending and commonly assigned U.S. patent application Ser. No. 12/277,563, filed on Nov. 25, 2008 and entitled "FACILITATING ACCESS TO DATA FROM VIRTUAL PRIVATE NETWORKS", the contents of which are incorporated by reference here. Generally, therein is broadly contemplated a "persistent VPN" (virtual private network) in which either or both of the following features are present: a) a current VPN connection that is already credentialed will not be severed when the computer changes to a suspend or hibernate mode; and, perhaps more importantly for the present discussion, b) a provision for performing unattended data retrieval activities, such as mail fetch, patch management, or software downloads.

In such an "always on" environment where a user's connected devices form a personal network or VPN of devices in bidirectional communication with one another (for example, sending and receiving emails), the controller in an electronic device (for example, laptop PC) is constantly polling another electronic device (for example, polling a mobile phone via Bluetooth® short-range wireless communication) to determine whether there are any updates (for example, new email).

The Bluetooth® interface draws a lot of power and the mobile phone will see degraded battery life if it must respond to repeated Bluetooth® requests. Similar draws on the laptop PC battery are also encountered.

Accordingly, embodiments of the invention provide for shared power management between two (or more) electronic devices (as for example between a laptop PC and a mobile phone) to establish a better power profile. In order to support an "always on" type environment for a user's devices while avoiding significant drawbacks that may be encountered in the way of drawing too much battery power from either device, embodiments of the invention employ various power management approaches.

The illustrated embodiments of the invention will be best understood by reference to the Figures. The following description is intended only by way of example, and simply illustrates certain selected presently preferred embodiments of the invention as claimed herein.

Referring now to FIG. 1, there is depicted a block diagram of an illustrative embodiment of a computer system 100. The illustrative embodiment depicted in FIG. 1 may be a notebook or laptop PC computer system, such as one of the ThinkPad® series of personal computers sold by Lenovo (US) Inc. of Morrisville, N.C. As will become apparent from the following description, however, embodiments of the invention are applicable to operation by any appropriately configured data processing system or other electronic device, including but not limited to mobile computing devices such as personal digital assistants (PDAs), smart/mobile phones, et cetera.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD™ Corporation or a processor produced by Intel® Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50. AMD™ is a trademark of Advanced Micro Devices, Inc. Intel® is a trademark of Intel Corporation in the U.S. and other countries.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, etc. In addition, I/O controller 70 supports external communication by computer system 100 via serial and parallel ports. The USB Bus and USB Controller (not shown) are part of the Local PCI controller (52).

Figure 2:
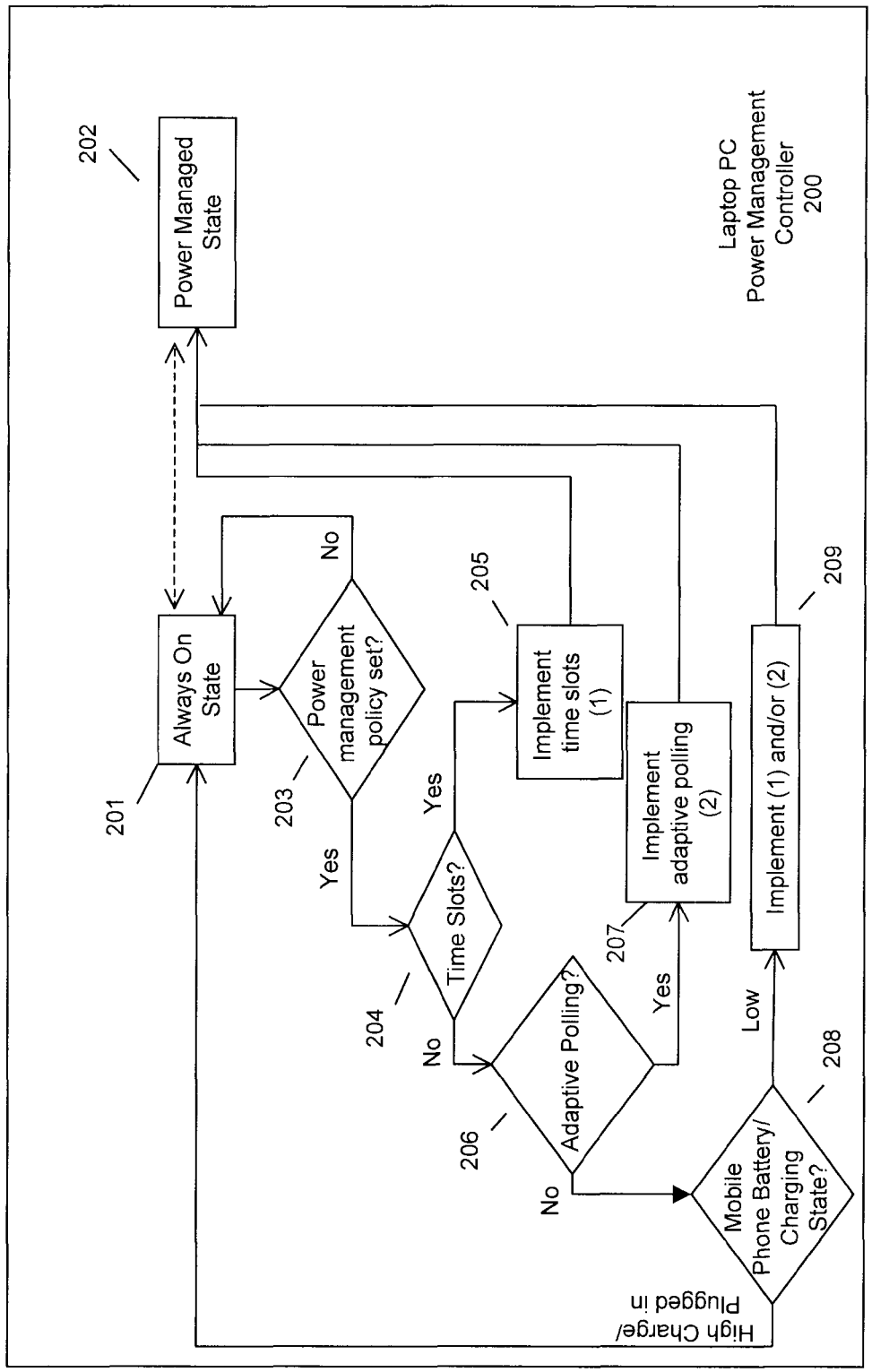
FIG. 2 illustrates power management methods according to an exemplary embodiment of the invention.

As illustrated in FIG. 2, an embodiment of the invention provides a first electronic device 200 (for the purpose of this non-limiting example, a laptop PC) configured to establish a power policy (preset and/or user implemented/updated) such that a controller of the laptop PC will only query a user's other electronic device (for the purpose of this non-limiting example, a mobile phone) at particular time slots. For example, it may not be optimal in a power management sense to poll late at night when the user is asleep and unlikely to want and/or need communications (for example, emails). Establishing a power profile whereby the laptop PC may only poll between various time slots (for example, during the working day) will save power and extend the battery life (of both devices).

Accordingly, the laptop PC can transition between an "always on" state 201 and a "power managed" state 202. The power managed state 202 can take a variety of forms, herein are described the use of time slots and adaptive polling as non-limiting examples that may be used one at a time or in combination with one another. At 201, the laptop PC is configured in the always on state. At 203 the laptop PC can determine if a power management policy has been set. If not, the laptop PC may remain in the always on state. However, if a power management policy has been set, at 204 it is determined if time slots for polling have been provided. Again, a user can for example set the time slots to a predetermined default and these can be updated/changed as necessary.

If time slots have been set, the laptop PC implements the time slots 205 and can be thought of as shifting into the power managed state 202. If the time slots have not been set, the laptop PC may remain in the always on state (not shown). Moreover, if time slots have not been set, it can be determined if another power management policy is in place, for example at 206 it is determined if an adaptive polling policy has been set. If adaptive polling is set, at 207 the adaptive polling is implemented and the laptop PC shifts to the power managed state 202.

The adaptive polling mechanism is essentially a way to intelligently reduce polling in order to conserve power of both devices involved. For example, if the laptop PC detects that there is not a reason to poll (for example, no new email for over a predetermined time period, for example, an hour), the laptop PC can adaptively extend the length of time between polls. This adapts the polling mechanism to be in synchronization with the user's email traffic, where during times that there is little or no activity on the user's email account, reduced polling and attendant battery power consumption is employed. Moreover, an embodiment of the invention is configured to employ both time slots and adaptive polling. For example, during certain time frames, the length between requests to poll can be made longer to save battery life.

According to an embodiment of the invention, a laptop PC is configured to ascertain the current battery state of the mobile phone 208 and adjust its polling accordingly at 209. For example, if the battery in the mobile phone goes below a predetermined threshold, the laptop PC adjusts its polling scheme (to lessen polling) to allow additional battery life. For example, the laptop PC requests once an hour the state of the battery in the mobile phone. If it is determined to be below a certain threshold, the laptop PC implements an appropriate power management policy (such as the time slots and/or the adaptive polling mechanism as described herein) to save battery life.

According to an embodiment of the invention, from the laptop PC, the charging state of the mobile phone is determined 208 and a change is made to the characteristic of the communication protocol application (between the devices). For example, if it is determined that the mobile phone is connected to a power source, the laptop PC is configured to poll freely since the battery drain (on the mobile phone) will be negligible. If the mobile phone is on battery power, one or more of the foregoing power management policies (discussed above) is implemented, thereby saving power.

Figure 3:
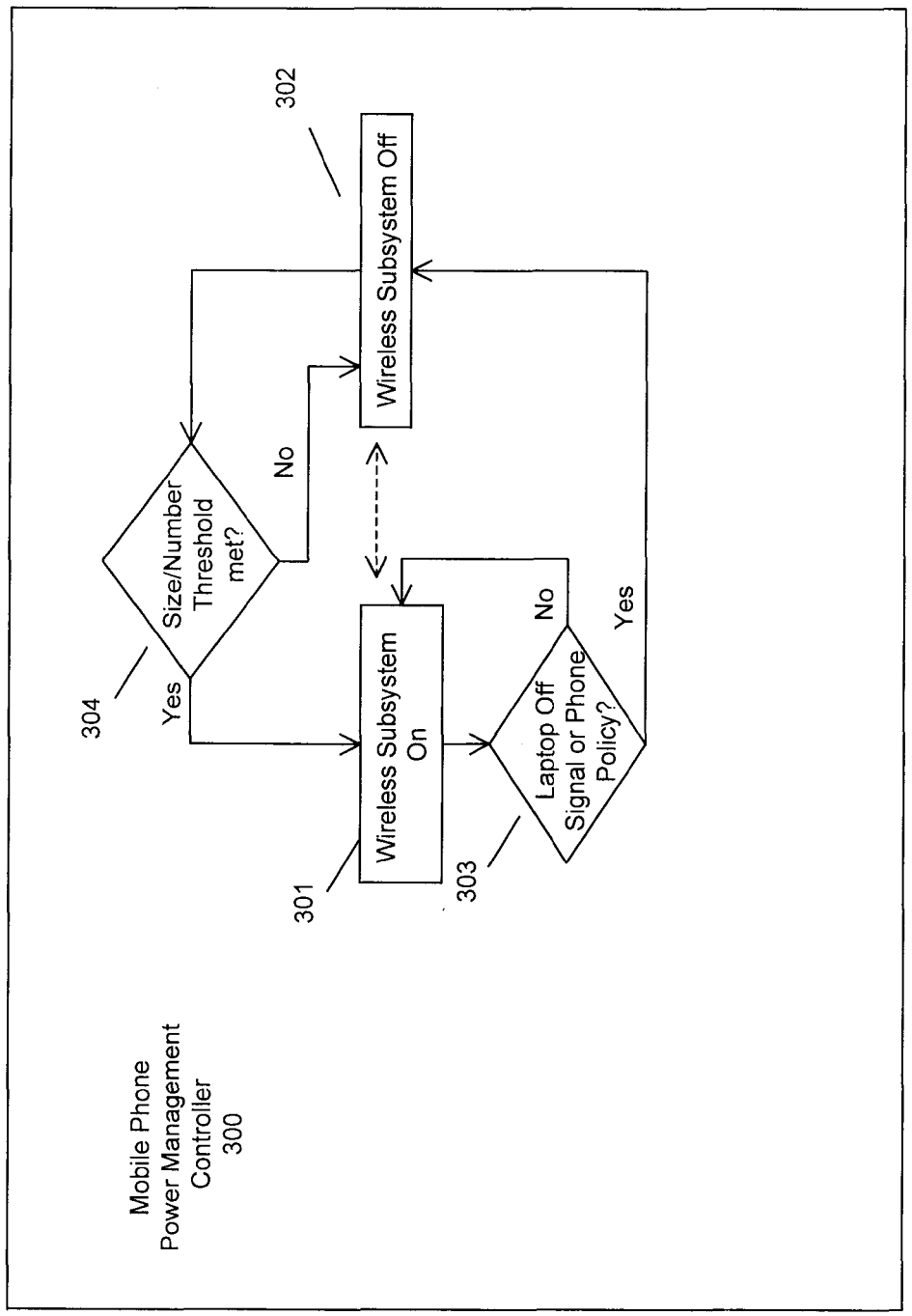
FIG. 3 illustrates power management methods according to an exemplary embodiment of the invention.

Referring now to FIG. 3, according to an embodiment of the invention, an electronic device 300 (again, for this non-limiting example, a mobile phone) is configured to turn off its wireless (for example, Bluetooth®) subsystem (by policy). The policy may be inherent to the mobile phone or dictated to it via command from another device, discussed further herein. When the wireless subsystem is on at 301, the mobile phone first determines if a power management policy is set. If there is not a power management policy, the wireless subsystem may remain on. Even if the mobile phone is not being polled (by the laptop PC), allowing the wireless subsystem to remain on will be a power drain, as the mobile phone will continually search for other (for example, Bluetooth® enabled) devices.

Accordingly, the wireless subsystem can be turned off via a power management policy. This can be accomplished for example via a command received from the laptop PC (as determined at 303) or through a policy manager in the mobile phone (similar to the power policies described above). Having the laptop PC instruct the wireless subsystem to power off (for a specific amount of time) saves power, for example, because the Bluetooth® subsystem draws a substantial amount of power at the mobile phone. The subsystem could periodically be re-enabled to synchronize with the laptop PC, per the laptop PC command received.

According to an embodiment of the invention, the mobile phone turns on the Bluetooth® interface only after a certain communication related threshold has been met. In such a situation, the default setting could be for the wireless subsystem to remain in the off state 302 until the threshold is met. For example, the mobile phone is configured to ascertain if a threshold number of emails have been received at 304 and turn on the Bluetooth® interface only after it has received the threshold number of emails for the user. Otherwise, the subsystem may remain in the off state 302. The laptop PC can synchronize itself with the mobile phone at that time (when the wireless subsystem turns on) and then the mobile phone would thereafter turn off the interface until it again reaches the threshold. Since there might be important communications (emails), another embodiment of the invention is configured to combine this method with the above described methods (for example, having the mobile phone turn the Bluetooth® interface on and off according to a predetermined policy).

Another embodiment of the invention ties battery life to file transfer size. Depending on the battery charge (on either device, although FIG. 3 simply illustrates a mobile phone implementation) and the size of the file (amount of data), the system may automatically cap the size of the file transfer to limit the amount of charge used to transfer data. Accordingly, it is determined if a size threshold has been met at 304. If the size threshold is met (not exceeded with reference to the remaining battery), the wireless subsystem may remain on. In contrast, if the size threshold has not been met (for example, the file is too large given the current battery state), the wireless subsystem may be turned off and the transfer delayed. Thus, as the battery (on either device, laptop PC or mobile phone) gets lower in charge, the system according to an embodiment of the invention is configured to cap the size of the file/data transfer to limit the amount of charge used to transfer the file(s).

In brief recapitulation, embodiments of the invention implement one or more communication protocols that correspond to one or more power management policies on one or more devices in order to intelligently manage the finite amount of battery power available while maximizing synchronization between connected devices in an "always on" environment. In this description and Figures have been presented non-limiting examples of embodiments of the invention. However, the power management policies and procedures outlined above are only by way of example and one having ordinary skill in the art will recognize that various departures from these non-limiting examples are possible and fall within the scope of the embodiments of the invention, as claimed.

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the embodiments.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Accordingly, elements may be implemented on at least one electronic device running suitable software programs. These may also be implemented on at least one Integrated Circuit or part of at least one Integrated Circuit. Thus, it is to be understood that elements of the invention may be implemented in a combination of both hardware and software. Again, computer/machine-readable programs may in combination with an electronic device perform the functions of embodiments of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the Figures and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
one or more processors; and
a program storage device tangibly embodying a program of instructions executable by the one or more processors, the program of instructions comprising:
computer readable program code that implements one or more communication protocols that implement one or more power management policies that reduce power consumption of one or more other electronic devices in bidirectional communication with the apparatus;
wherein the one or more communication protocols comprise a communication protocol wherein the apparatus polls at certain times the one or more other electronic devices for new communications based on email traffic;
wherein the apparatus and the one or more other electronic devices are in wireless bidirectional communication and form a personal network of devices for one or more users; and
computer readable program code that transmits a power management signal to the one or more other electronic devices in bidirectional communication with the apparatus;
wherein the power management signal includes an instruction to power off a wireless subsystem of the one or more other electronic devices for a predetermined period of time and periodically re-enable the wireless subsystem of the one or more other electronic devices according to a policy.

2. The apparatus according to claim 1, wherein the program of instructions further comprises:
computer readable program code that determines a battery state of the one or more other electronic devices in bidirectional communication with the apparatus; and
computer readable program code that changes the one or more communication protocols responsive to a determination that the battery state of the one or more other electronic devices in bidirectional communication with the apparatus is low.

3. The apparatus according to claim 1, wherein the program of instructions further comprises:
computer readable program code that determines a charging state of the one or more other electronic devices in bidirectional communication with the apparatus; and
computer readable program code that, responsive to a determination that the charging state of the one or more other electronic devices in bidirectional communication with the apparatus is charging, changes the one or more communication protocols.

4. The apparatus according to claim 1, wherein either one of the apparatus and the one or more other electronic devices receive and send data destined for the other.

5. The apparatus according to claim 1, wherein the apparatus is a laptop PC; wherein the one or more other electronic devices comprise a mobile phone; and further wherein the laptop PC sends a command to the mobile phone to turn off a wireless subsystem of the mobile phone.

6. The apparatus of claim 1, wherein the one or more communication protocols include a communication protocol wherein the apparatus adaptively polls the one or more other electronic devices for new communications.

7. The apparatus of claim 1, wherein the policy includes a threshold number of communications received at the one or more other electronic devices.

8. A method comprising:
utilizing one or more processors to execute a program of instructions tangibly embodied on one or more program storage devices, the program of instructions comprising:
computer readable program code that implements on a first electronic device one or more communication protocols that implement one or more power management policies that reduce power consumption of one or more other electronic devices in bidirectional communication with the first electronic device;
wherein the one or more, communication protocols comprise a communication protocol wherein the first electronic device polls at certain times the one or more other electronic devices for new communications based on email traffic;
wherein the first electronic device and the one or more other electronic devices are in wireless bidirectional communication and form a personal network of devices for one or more users; and
computer readable program code that transmits a power management signal to the one or more other electronic devices in bidirectional communication with the first electronic device;
wherein the power management signal includes an instruction to power off a wireless subsystem of the one or more other electronic devices for a predetermined period of time and periodically re-enable the wireless subsystem of the one or more other electronic devices according to a policy.

9. The method according to claim 8, wherein the program of instructions further comprises:
computer readable program code that determines a battery state of the one or more other electronic devices in bidirectional communication with the first electronic device; and
computer readable program code that changes the one or more communication protocols responsive to a determination that the battery state of the one or more other electronic devices in bidirectional communication with the first electronic device is low.

10. The method according to claim 8, wherein the program of instructions further comprises:
computer readable program code that determines a charging state of the one or more other electronic devices in bidirectional communication with the first electronic device; and
computer readable program code that changes the one or more communication protocols responsive to a determination that the charging state of the one or more other electronic devices in bidirectional communication with the first electronic device is charging.

11. The method according to claim 8, wherein either one of the first electronic device and the one or more other electronic devices receive and send data destined for the other.

12. The method of claim 8, wherein the policy includes a threshold number of communications received at the one or more other electronic devices.

13. The method of claim 8, wherein the one or more communication protocols include a communication protocol wherein the apparatus adaptively polls the one or more other electronic devices for new communications.

14. The method according to claim 8, wherein the first electronic device is a laptop PC; wherein the one or more other electronic devices comprise a mobile phone; and further wherein the laptop PC sends the instruction to the mobile phone to turn off a wireless subsystem of the mobile phone.

15. A computer program product comprising:
a computer readable storage device having computer readable program code embodied therewith, the computer readable program code being executable by a processor and comprising:
computer readable program code that implements on a first electronic device one or more communication protocols that implement one or more power management policies that reduce power consumption of one or more other electronic devices in bidirectional communication with the first electronic device, wherein the one or more communication protocols comprise a communication protocol wherein the first electronic device polls at certain times the one or more other electronic devices for new communications based on email traffic;
wherein the first electronic device and the one or more other electronic devices are in wireless bidirectional communication and form a personal network of devices for one or more users; and
computer readable program code that transmits a power management signal to the one or more other electronic devices in bidirectional communication with the first electronic device;
wherein the power management signal is configured includes an instruction to power off a wireless subsystem of the one or more other electronic devices for a predetermined period of time and periodically re-enable the wireless subsystem of the one or more other electronic devices according to a policy.

* * * * *